3 Sheets—Sheet 1.

M. J. McBIRD.
SAWING STONE OR MARBLE.

No. 15,380.  Patented July 22, 1856.

Inventor;
Matthew J. McBird

3 Sheets—Sheet 2.

M. J. McBIRD.
SAWING STONE OR MARBLE.

No. 15,380. Patented July 22, 1856.

Inventor;
Matthew J. McBird

3 Sheets—Sheet 3.
M. J. McBIRD.
SAWING STONE OR MARBLE.
No. 15,380. Patented July 22, 1856.
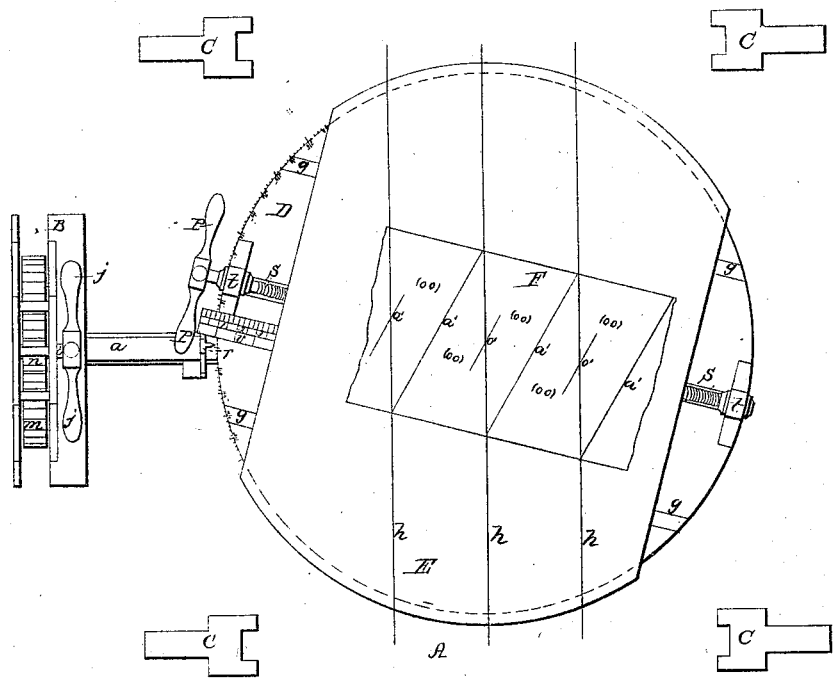

UNITED STATES PATENT OFFICE.

MATTHEW J. McBIRD, OF LOGANSPORT, INDIANA.

MACHINE FOR SAWING STONE OR MARBLE.

Specification of Letters Patent No. 15,380, dated July 22, 1856.

*To all whom it may concern:*

Be it known that I, MATTHEW J. Mc-BIRD, of the city of Logansport, county of Cass, in the State of Indiana, have invented a new and Improved Mode of Sawing Stone or Marble into Tapering and other Forms; and I do hereby declare that the following is a full and exact description thereof, reference being had to the accompanying drawings, making a part of this specification, in which—

Figure 1:
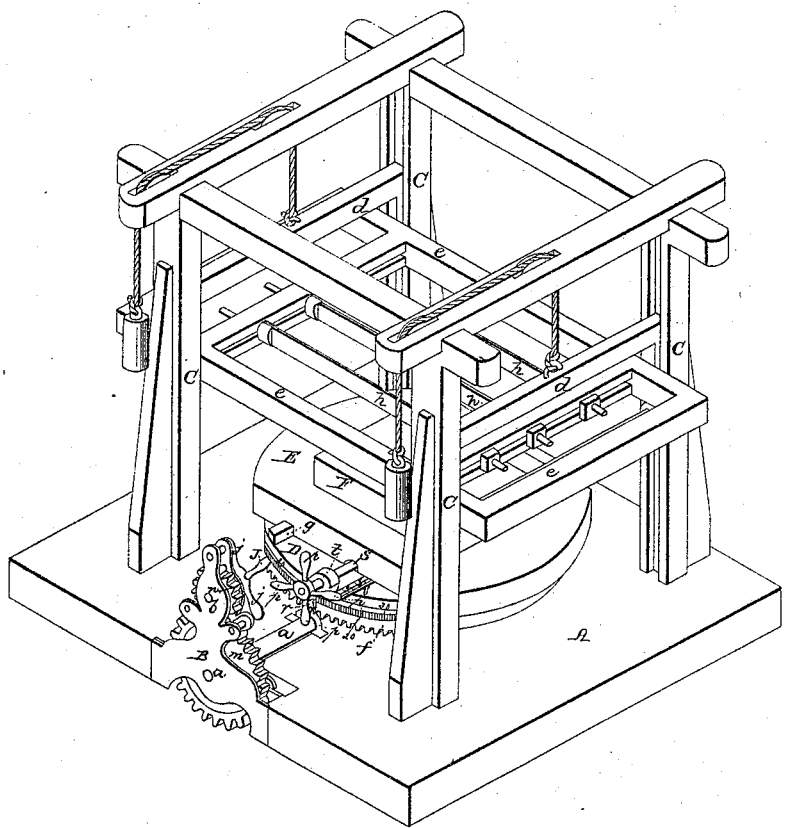
Figure 2:
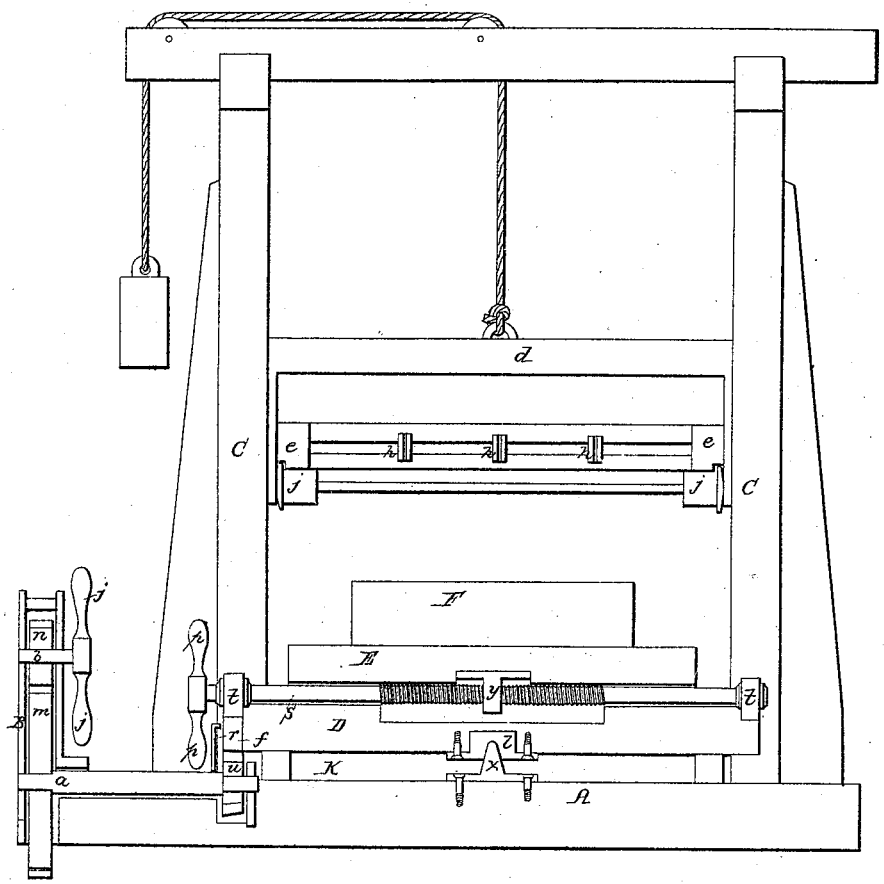

Figure 1, is a perspective view of a model exhibiting my improvement. Fig. 2, is a transverse vertical section of the same. Fig. 3, is a horizontal section, or plan.

Similar letters of reference indicate corresponding parts in the several figures.

To enable others skilled in the art to make and use my improvement or invention, I will proceed to describe its construction and operation.

A Fig. 1, represents a quadrangular base to the general framework.

B is a standard or support, in which are bearings to shafts $a$ and $b$.

C C C C are uprights, supporting and guiding frames $d\ d$, and in these frames the saw sash $e$ plays, resting on friction rollers $i$.

$h\ h\ h$ are saws lying horizontally and strained in the sash $e$ in the usual manner. Said saws and sash are propelled, controlled and operate in all respects in the ordinary way, as when sawing stone or marble into right angular forms.

D is a circular turntable, having a segmental rack $f$ attached to one side, as shown. Said turntable has a rotating axis or center $l$, fitted on the pivot $x$, around which it revolves, and is supported and moves on a circular way K, as shown in Fig. 2.

E is an oblong platform or bed, having straight sides and round formed ends, and on which lies the stone or marble F to be sawed. Said platform or bed has a free lateral movement horizontally on permanent ways $g\ g$ lying upon and attached to turntable D, as shown in Figs. 1 and 3.

S is a rod having a screw thread thereon, and lies horizontally under the center of platform or bed E, and confined longitudinally in bearings $t\ t$ attached to, and forming part of turntable D. Said rod or screw S passes through, and takes effect into the nut or female screw $y$ attached underneath and in the center of platform or bed E, as is plainly shown in Fig. 2.

P P P P seen in Fig. 1, are arms attached to screw or rod S; by revolving these arms the screw or rod S is operated and the platform or bed E made to move laterally.

V is a rule or gage attached to the turntable D, having degrees and figures marked thereon, and over which moves the platform or bed E. The object of said rule or gage is, to enable the operator to adjust the platform or bed in the position required, with greater ease and precision.

$r$ Fig. 1, is an index hand attached to base A, and points to the degrees and figures marked on rack $f$, by means of which index hand and figures, the turntable D may be adjusted with great precision at equal distances either way from any given position or point. Arms $j\ j$ and pinion $n$ are both attached to shaft $b$, the latter gearing into cogwheel $m$. Cogwheel $m$ and pinion $n$ are attached to shaft $a$, the latter gearing into rack $f$, thus forming a connection between arms $j\ j$ and turntable D in transmitting power applied to the arms $j\ j$ to said turntable, as a means of revolving the same.

Having thus described the construction of my improvement, its operation is as follows: The stone or marble F, is placed on the platform or bed E, in the usual way, as shown in Fig. 3. The arms $j\ j$, are then turned, which causes the turntable D to revolve, thereby enabling the operator to adjust the stone or marble F, in any oblique position required under parallel saws $h\ h\ h$, as shown in Fig. 3. Said saws are then made to saw down through the stone or marble F, cutting one side of each of the tapering pieces $(oo)$ $(oo)$ $(oo)$ $(oo)$ $(oo)$ with use of three saws. The saws $h$ are then elevated again to their former position; and the turntable D reversed in its position equal to its first degree of obliquity, bringing the saws $h$ over the material F so as to strike the lines $o'\ o'\ o'$ and if made to saw down will cut the stone or marble into diamond shaped pieces, such as are used in constructing stone or marble flooring. But should the stone or marble F be moved laterally by operating the arms P P P, half the distance existing between the saws $h$, prior to sawing down the aforesaid second time, the said saws will then be brought over the lines a' a' a', and if made to saw down would cut the other sides of the tapering pieces (oo) (oo) (oo) (oo) (oo) as Fig. 3 clearly shows. The material being sawed, being thus controlled, by varying the extent or degree of movement of the turntable D, and the platform or bed E, and also the distance between the saws h, as may be required, acute angular or obelisk forms having any degree of taper may be sawed with great ease and rapidity, with the use of the common parallel gang saws; in contradistinction to the use of obliquely running saws, in sawing tapering forms, or, to changing the position of the stone or marble in any other manner on the permanent platform or bed now in use.

What I claim as my invention and desire to secure by Letters Patent, is—

The combination of the turntable D, and the lateral moving platform or bed E, when connected and arranged substantially as shown; so that, when the turntable D is revolved, the stone or marble F, will be brought in oblique positions under parallel moving saws h, while the platform or bed E, when that is given a lateral transverse movement to the parallel position of saws h, the stone or marble F is given a corresponding movement and brought to the position required, for the purposes herein set forth.

MATTHEW J. McBIRD.

Witnesses:
HORACE COLEMAN,
JNO. FARQUHAR.